(12) United States Patent
Resan

(10) Patent No.: US 9,698,555 B2
(45) Date of Patent: Jul. 4, 2017

(54) OPTICAL SOURCE WITH PASSIVE PULSE SHAPING

(71) Applicant: Lumentum Switzerland AG, Schlieren (CH)

(72) Inventor: Bojan Resan, Dietikon (CH)

(73) Assignee: Lumentum Switzerland AG, Schlieren (CH)

(*) Notice: Subject to any disclaimer, the term of this patent is extended or adjusted under 35 U.S.C. 154(b) by 0 days.

(21) Appl. No.: 15/216,305

(22) Filed: Jul. 21, 2016

(65) Prior Publication Data
US 2016/0352061 A1    Dec. 1, 2016

Related U.S. Application Data

(63) Continuation of application No. 14/722,609, filed on May 27, 2015, now Pat. No. 9,401,580.

(51) Int. Cl.
| | |
|---|---|
| H01S 3/00 | (2006.01) |
| H01S 3/16 | (2006.01) |
| H01S 3/23 | (2006.01) |
| H01S 3/11 | (2006.01) |
| H01S 3/10 | (2006.01) |

(52) U.S. Cl.
CPC .......... *H01S 3/0078* (2013.01); *H01S 3/0057* (2013.01); *H01S 3/10023* (2013.01); *H01S 3/11* (2013.01); *H01S 3/1618* (2013.01); *H01S 3/1643* (2013.01); *H01S 3/2308* (2013.01); *H01S 3/2333* (2013.01)

(58) Field of Classification Search
CPC .... H01S 3/1618; H01S 3/2308; H01S 3/0057; H01S 3/11

USPC ........................................ 359/337.04, 337.4
See application file for complete search history.

(56) References Cited

U.S. PATENT DOCUMENTS

| | | | |
|---|---|---|---|
| 7,095,772 B1 | 8/2006 | Delfyett et al. | |
| 7,139,078 B2 | 11/2006 | Hogan | |
| 7,242,520 B2 | 7/2007 | Backus et al. | |
| 7,508,853 B2 * | 3/2009 | Harter | H01S 3/0092 372/30 |
| 7,542,192 B2 | 6/2009 | Resan et al. | |
| 8,509,270 B2 | 8/2013 | Harter et al. | |
| 8,582,613 B1 | 11/2013 | Kim et al. | |

(Continued)

FOREIGN PATENT DOCUMENTS

| | | |
|---|---|---|
| JP | 2007/242940 | 9/2007 |
| JP | 2014/003262 | 1/2014 |

OTHER PUBLICATIONS

Weiner, "Femtosencond pulse shaping using spatial light modulators", Review of Scientific Instruments, vol. 71, No. 5, May 2000, 32 pages.

(Continued)

*Primary Examiner* — Mark Hellner
(74) *Attorney, Agent, or Firm* — Harrity & Harrity, LLP

(57) ABSTRACT

The invention relates to sources of sub-picosecond optical pulses based on single-pass or double-pass optical amplifiers with an optical gain bandwidth in the 2-20 nm range. A passive pulse shaping filter is provided in front of the optical amplifier for pre-shaping seed optical pulses so as to passively pre-compensate for the gain narrowing effect in the optical amplifier. The passive pulse shaping filter may be based on a reflective thin film filter, which may be coupled to a mirror in a multi-pass configuration.

23 Claims, 9 Drawing Sheets

(56) References Cited

U.S. PATENT DOCUMENTS

| | | | |
|---|---|---|---|
| 8,855,151 | B2 | 10/2014 | Harter et al. |
| 9,401,580 | B1 | 7/2016 | Resan |
| 2005/0226278 | A1 | 10/2005 | Gu et al. |
| 2006/0050369 | A1 | 3/2006 | Kafka et al. |
| 2007/0030559 | A1 | 2/2007 | Backus et al. |
| 2007/0047965 | A1* | 3/2007 | Liu ............ H04B 10/299 398/147 |
| 2007/0177642 | A1 | 8/2007 | Liu |
| 2011/0103413 | A1 | 5/2011 | Kafka et al. |
| 2011/0286479 | A1 | 11/2011 | Limpert et al. |
| 2013/0336345 | A1 | 12/2013 | Kim et al. |
| 2014/0293404 | A1 | 10/2014 | Pierrot et al. |
| 2014/0376084 | A1 | 12/2014 | Harter et al. |

OTHER PUBLICATIONS

Pastirk et al., "No loss spectral phase correction and arbitrary phase shaping of regeneratively amplified femtosecond pulses using MIIPS", Optics Express, vol. 14, No. 20, Oct. 2, 2006, 7 pages.

Resan et al., "Pulse shaping, characterization and phase compensation system for enhanced ultrafast laser performance", Proc. of SPIE vol. 6451, 2007, 8 pages.

Délen et al., "Yb: YAG single crystal fiber power amplifier for femtosecond sources", Optics Letters, vol. 38, No. 2, Jan. 15, 2013, 3 pages.

Délen et al., "250 W single-crystal fiber Yb: YAG laser", Optics Letters, vol. 37, No. 14, Jul. 15, 2012, 3 pages.

Kienel et al., "Coherent beam combination of Yb: YAG single-crystal rod amplifiers", Optics Letters, vol. 39, No. 11, Jun. 1, 2014, 4 pages.

Zaouter et al., Direct amplification of ultrashort pulses in μ-pulling-down Yb: YAG single crystal fibers, Optics Letters, vol. 36, No. 5, Mar. 1, 2011, 3 pages.

Zeek et al., "Adaptive pulse compression for transform-limited 15-fs high-energy pulse generation", Optics Letters, vol. 25, No. 8, Apr. 15, 2000, 3 pages.

Barty et al., "Gerneration of 18-fs, multiterawatt pulses by regenerative pulse shaping and chirped-pulse amplification", Optics Letters, vol. 21, No. 9, May 1, 1996, 3 pages.

Backus et al., "High-efficiency, single-stage 7-kHz high-average-power ultrafast laser system", Optics Letters, vol. 26, No. 7, Apr. 1, 2001, 3 pages.

Liu et al., "Highly-stable monolithic femtosecond Yb-fiber laser system based on photonic crystal fibers", Optics Express, vol. 18, No. 15, Jul. 19, 2010, 9 pages.

Delfyett et al., "Ultrafast semiconductor laser-diode-seeded Cr:LiSAF regenerative amplifier system", Applied Optics, vol. 36, No. 15, May 20, 1997, 6 pages.

Südmeyer et al., "High-power ultrafast thin disk laser oscillators and their potential for sub-100-femtosecond pulse generation", Applied Physics B, 2009, 15 pages.

Brunner et al., "Diode-pumped femtosecond Yb:KGd(WO$_4$)$_2$ laser with 1.1-W average power", Optics Letters, vol. 25, No. 15, Aug. 1, 2000, 3 pages.

Extended European Search report corresponding to EP 16 16 9805, mailed Nov. 3, 2016, 8 pages.

\* cited by examiner

OPTICAL SOURCE WITH PASSIVE PULSE SHAPING

RELATED APPLICATION

This application is a continuation of U.S. patent application Ser. No. 14/722,609 (now U.S. Pat. No. 9,401,580), filed May 27, 2015, which is incorporated herein by reference.

TECHNICAL FIELD

The present disclosure generally relates to sources of optical pulses, and more particularly relates to sources of sub-picosecond optical pulses incorporating optical amplifiers with passive pulse pre-shaping.

BACKGROUND

Ultrashort optical pulses are useful in a variety of applications, including materials processing such as micromachining, ophthalmology, biomedical imaging, ultrafast spectroscopy, ultra-high-speed optical networks, reaction triggering, etc. Energetic optical pulses of sub-picosecond and femtosecond (fs) duration may be produced by sending seed optical pulses from a lower-power optical source, such as a mode-locked laser, through an optically pumped broadband power amplifier. However, short pulses that propagate through such amplifiers may experience amplitude and/or phase degradation, such as gain narrowing and self-phase modulation, resulting in an undesired broadening of an output pulse. The pulse shape degradation in optical amplifiers may be at least partially overcome by ultrafast active pulse shaping techniques developed earlier for telecommunication applications, such as for example temporal pulse shaping using acousto-optic modulators or spectral pulse shaping using liquid crystal spatial light modulators. Implementing active pulse shaping techniques for multi-pass and regenerative optical amplifiers based on Ti:Saphire gain elements, which optical gain bandwidth may be as high as 200-300 nanometers (nm), resulted in optical sources of 3-20 fs pulses geared for scientific research applications. However, the active pulse shaping may require the use of fast optical modulators and complicated control and feedback loops, thereby considerably complicating the amplifier design and raising cost. Another technique for pulse shaping in Ti:sapphire amplifiers relies on the use of an intra-cavity shallow broad-band filter inserted within the multi-pass cavity of the amplifier. This technique may not be, however, directly applicable to single-pass optical amplifiers that are based on gain elements that have a much higher peak gain value but a narrower gain bandwidth than the Ti:sapphire material, such as for example single-crystal Yb:YAG rods or disks. Optical pulse sources based on such gain elements with 10 dB of gain or more per pass that may be capable of generating somewhat longer sub-picosecond pulses of 400-800 fs duration are of interest for industrial application, and may benefit from an inexpensive pulse shaper to combat the gain narrowing effect in the amplifier.

Accordingly, it may be understood that there may be significant problems and shortcomings associated with current solutions and technologies for providing sub-picosecond optical pulses in optical sources using high-gain narrow-bandwidth gain elements.

SUMMARY

Accordingly, the present disclosure relates to an optical pulse source comprising a seed optical source for generating a seed optical pulse of a sub-picosecond duration, an optical amplifier for amplifying the seed optical pulse, and a pulse shaping filter disposed in the path of the seed optical pulse for broadening the seed optical pulse in spectrum prior to the amplifying so as to pre-compensate for a gain narrowing effect in the optical amplifier. The optical amplifier may comprise a gain element providing a bell-like gain spectrum with a gain bandwidth of 2 to 20 nanometers and a single-pass optical gain of at least 3 dB. The optical amplifier may be a single-pass amplifier or a double-pass amplifier. In accordance with one feature of the present disclosure, the pulse shaping filter may comprise a thin-film notch filter with a notch bandwidth in the range of 2 to 20 nm. In accordance with another feature of the present disclosure, the pulse shaping filter may comprise a mirror that is optically coupled to the thin film notch filter in a multi-pass configuration wherein the seed optical pulse is filtered by the thin film notch filter two or more times prior to entering the optical amplifier.

BRIEF DESCRIPTION OF THE DRAWINGS

Embodiments disclosed herein will be described in greater detail with reference to the accompanying drawings, which represent preferred embodiments thereof and in which like elements are indicated with like reference numerals, and wherein.

DETAILED DESCRIPTION

In the following description, for purposes of explanation and not limitation, specific details are set forth, such as particular optical devices, assemblies, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and optical assemblies are omitted so as not to obscure the description of the present invention. Note that as used herein, the terms "first", "second" and so forth are not intended to imply sequential ordering, but rather are intended to distinguish one element from another unless explicitly stated. The terms "transmission" and "transmission characteristic" as used herein refer to a characteristic of an optical filter that relates an input spectrum into the filter to an output spectrum from the filter, and thus may be used to describe both transmissive and reflective filters.

Embodiments described herein relate to optical pulse amplifiers that utilize gain elements based on materials that, when pumped with suitable pump energy, are capable of providing optical gain of a relatively high magnitude, for example about or greater than 3 dB in a single pass, or preferably about or greater than 10 dB in a single pass, but of a relatively low gain bandwidth, for example less than 20 nanometers (nm), or more typically in the range of 2 to 10 nm. Examples include, but are not limited to, gain elements based on ytterbium (Yb) doped materials such as Yb:YAG (Yb doped yttrium aluminum garnet), Yb:KYW, Yb:KGW (Yb doped monoclinic potassium double tungstates), Yb:CALGO (Yb:CaGdAlO$_4$), Yb:Lu2O3, and Yb:LuScO3, and in particular single-crystal gain elements based on these materials. In the context of the present disclosure, the term "width", when used with reference to a feature defined in the time or frequency domain, such as a pulse or a spectral line or peak, means the full width at half maximum (FWHM) of the respective feature, unless clearly stated otherwise.

Figure 1:
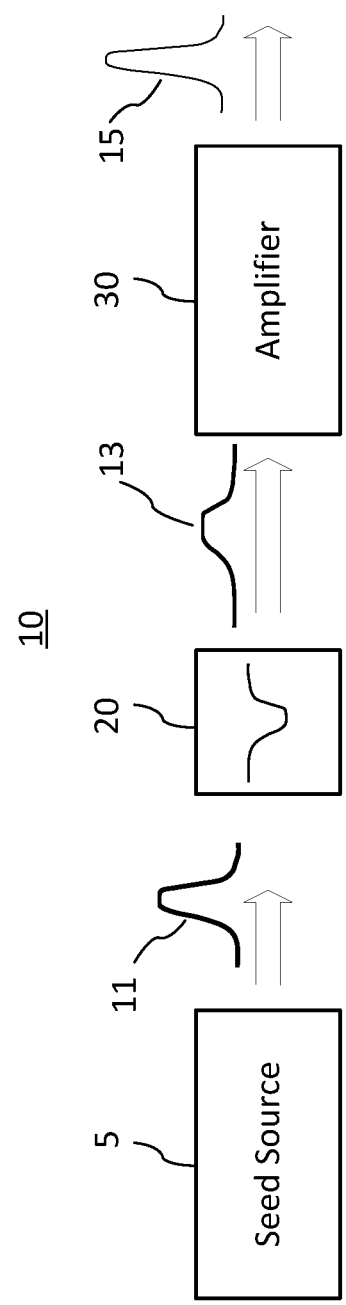
FIG. 1 is a general block diagram of an optical pulse source including a passive pulse pre-shaper.
Figure 2:
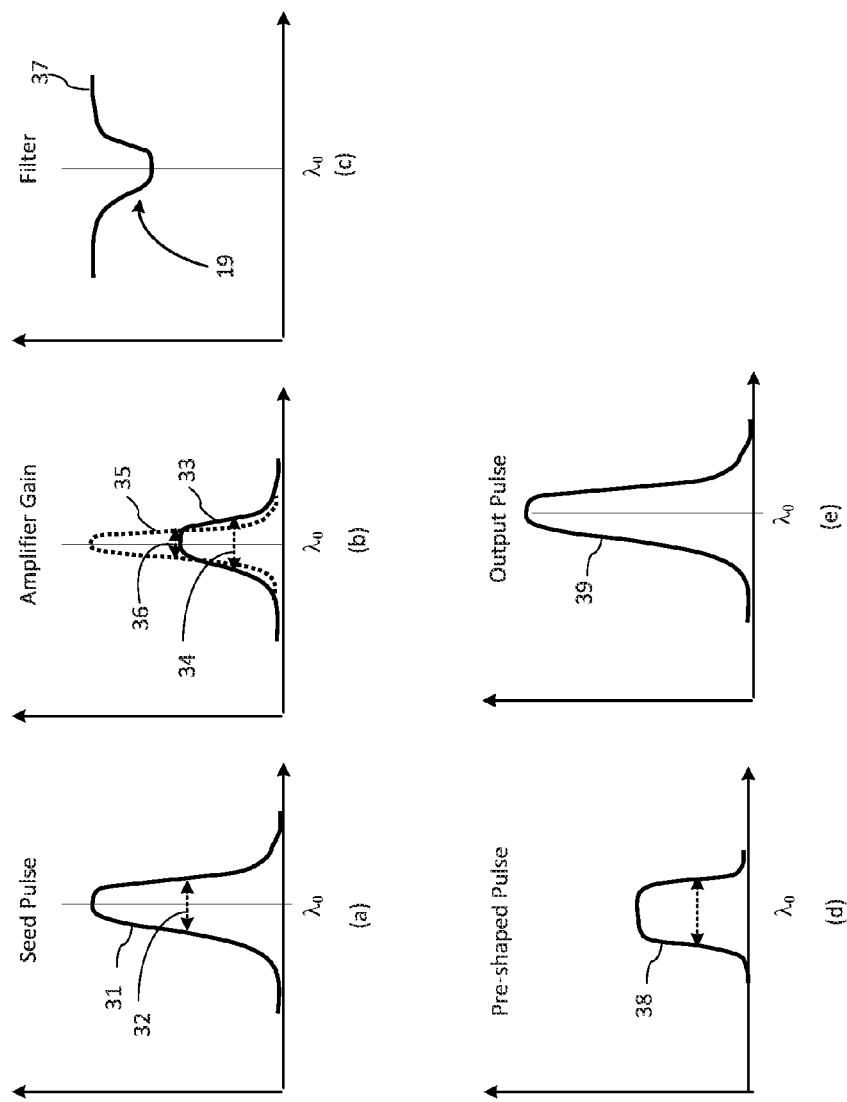
FIG. 2 is graph schematically illustrating optical spectra of a seed pulse (a), an amplifier gain and the gain narrowing effect (b), a transmission characteristic of an exemplary pulse pre-shaping filter (c), a pre-shaped seed pulse (d), and an amplified output pulse (e)

With reference to FIGS. 1 and 2, an optical pulse source 10 generally illustrated in FIG. 1 includes a seed optical source 5, which is configured for generating seed optical pulses 11 of a sub-picosecond duration, and an optical amplifier 30 for amplifying the seed optical pulses and for producing therefrom output optical pulses 15 of a greater pulse energy. The seed optical source 5 may be embodied using any suitable source of optical pulses of a desired width that is wavelength-matched to the optical amplifier 30, including a bulk solid-state laser, micro-disk, fiber or semiconductor laser with active, passive or hybrid mode-locking. Examples of such optical pulse sources are described in "Ultrafast semiconductor laser-diode-seeded Gr:LiSAF regenerative amplifier system", by Peter J. Delfyett et al, APPLIED OPTICS, 20 May 1997, Vol. 36, No. 15; "Highly-stable monolithic femtosecond Yb-fiber laser system based on photonic crystal fibers", by Xiaomin Liu et al, OPTICS EXPRESS 19 Jul. 2010/Vol. 18, No. 15, pp. 15476-15483; "High-power ultrafast thin disk laser oscillators and their potential for sub-100-femtosecond pulse generation" by T. Sudmeyer et al, Appl Phys B (2009) 97: pp. 281-295; and "Diode-pumped femtosecond Yb:KGd(WO4)2 laser with 1.1-W average power", by F. Brunner et al, OPTICS LETTERS Aug. 1, 2000, Vol. 25, No. 15, pp 1119-1121, all of which are incorporated herein by reference. By way of example, in one representative embodiment the seed optical source 5 may be in the form of a mode-locked Yb doped fiber or solid-state laser source as known in the art, which is configured for emitting sub-picosecond seed optical pulses 11 that may be for example a few hundred femtosecond long, with the pulse duration in the range of 100 fs to 600 fs and a spectral width 32 (FIG. 2, panel (a)) in the range of 1 to 15 nm. In one or more exemplary embodiments described herein, the optical amplifier 30 may include, or be in the form of, an optical gain element having in operation a bell-like gain spectrum 33 (FIG. 2, panel (b)) peaking at a gain central wavelength $\lambda_0$ and having a spectral bandwidth 34 that may be in the range of 2 to 20 nm, or in the range of 2 to 10 nm typically for Yb-doped gain materials. The gain element may provide a single-pass optical gain of at least 3 dB in magnitude, and more preferably at least 10 dB or greater, for example in the range of 10 to 30 dB. Accordingly, the amplifier 30 may be a single-pass amplifier or a double-pass amplifier, wherein the seed pulses travel through the gain element no more than once in each direction. Due to a relatively high single-pass gain resulting in a high pulse power after travelling the gain element once or twice, passing the pulses through the gain element more than twice may not be useful due to the gain saturation in the gain medium and/or detrimental thermal effects therein that may lead to beam distortions.

Turning now to FIG. 2 while continuing to refer to FIG. 1, the seed optical pulses 11, which optical spectrum 31 is schematically illustrated in panel (a) of the figure, may experience pulse broadening in the optical amplifier 30 due to the gain narrowing effect in the amplifier 30 as generally known in the art. The gain narrowing in the optical amplifier occurs when the width 34 of the amplifier gain spectrum 33 (FIG. 2($b$)) is close to, or smaller than, the spectral width 32 of the seed optical pulse 11, so that the wavelengths close to the gain central wavelength $\lambda_0$ corresponding to the peak of the gain spectrum 33 experience stronger amplification than the wavelengths further away from the gain peak wavelength $\lambda_0$, resulting in the narrowing of the optical spectrum of the pulse as it propagates through the amplifier and a corresponding broadening of the output pulse in time domain. This is schematically illustrated in FIG. 2 ($b$), wherein the solid curve 33 illustrates the gain spectrum of the amplifier, and the dashed curve 35 illustrates the narrower spectrum of the output optical pulse when the seed optical pulse 11 is sent directly into the optical amplifier 30, with a spectral width 36 of the output pulse being smaller than the spectral width 32 of the input seed pulse. By way of example a seed optical pulse having a temporal width in the range 100 to 600 fs at the input of the amplifier 30 may be broaden in time by a factor of about two or more at the output of the amplifier 30, which may result in the pulse width of the output pulse 15 exceeding one picosecond.

Referring now back to FIG. 1 while continuing to refer to FIG. 2, a pulse shaping filter 20 may be disposed in the path of the seed optical pulse 11 prior to the amplifier 30 in order to eliminate, or at least lessen, the undesirable effects of the gain narrowing in the amplifier 30 on the pulse width of the output pulse 15. The pulse shaping filter 20 may be configured for broadening the optical spectrum of the seed optical pulse 11 prior to the amplifying in the amplifier 30, so as to pre-compensate for the narrowing of the pulse spectrum in the optical amplifier 30. The seed optical pulses that are pre-shaped, i.e. spectrally broadened, by the action of the pulse shaping filter 20 may also be referred to herein as the pre-shaped seed pulses 13 or as spectrally broadened seed pulses 13. The transmission characteristic of an exemplary filter 20 is schematically illustrated in FIG. 2 ($c$), and is configured so as to attenuate light in the seed optical pulses stronger at the central wavelength $\lambda_0$ of the bell-like gain spectrum 33 than at the wings thereof, thereby effectively flattening a top portion of the seed pulse spectrum and thus broadening it, i.e. increasing its FWHM width. As illustrated in FIG. 2 ($c$), filter 20 may be described, substantially, as a notch filter having a notch, i.e. local minimum, 19 in its transmission characteristic at a desired notch central wavelength $\lambda_f$. In a preferred embodiment, the gain central wavelength $\lambda_0$ matches the central wavelength of the seed pulse spectrum 31, and filter 20 is configured with the notch 19 centered at the central wavelength $\lambda_f$ that is substantially equal to the central wavelength $\lambda_0$ of the bell-like gain spectrum 33 of the amplifier gain element, i.e. $\lambda_f = \lambda_0$, resulting in the flattened optical spectrum 38 of the pre-shaped seed pulse 13 at the output of filter 20, as illustrated in FIG. 2 (d). If the gain central wavelength $\lambda_0$ and the central wavelength of the seed pulse spectrum 31 do not coincide, the transmission notch 19 of filter 20 may be centered at a suitable wavelength between peaks of the amplifier gain spectrum 33 and seed pulse gain spectrum 31, which may be selected so as to pre-compensate for the amplifier gain narrowing effect on the seed pulse spectrum. By suitably selecting the shape and depth of the notch 19 in the transmission characteristic 37 of filter 20, the gain narrowing effect of the amplifier 30 may be substantially eliminated or at least lessened.

Figure 3A:
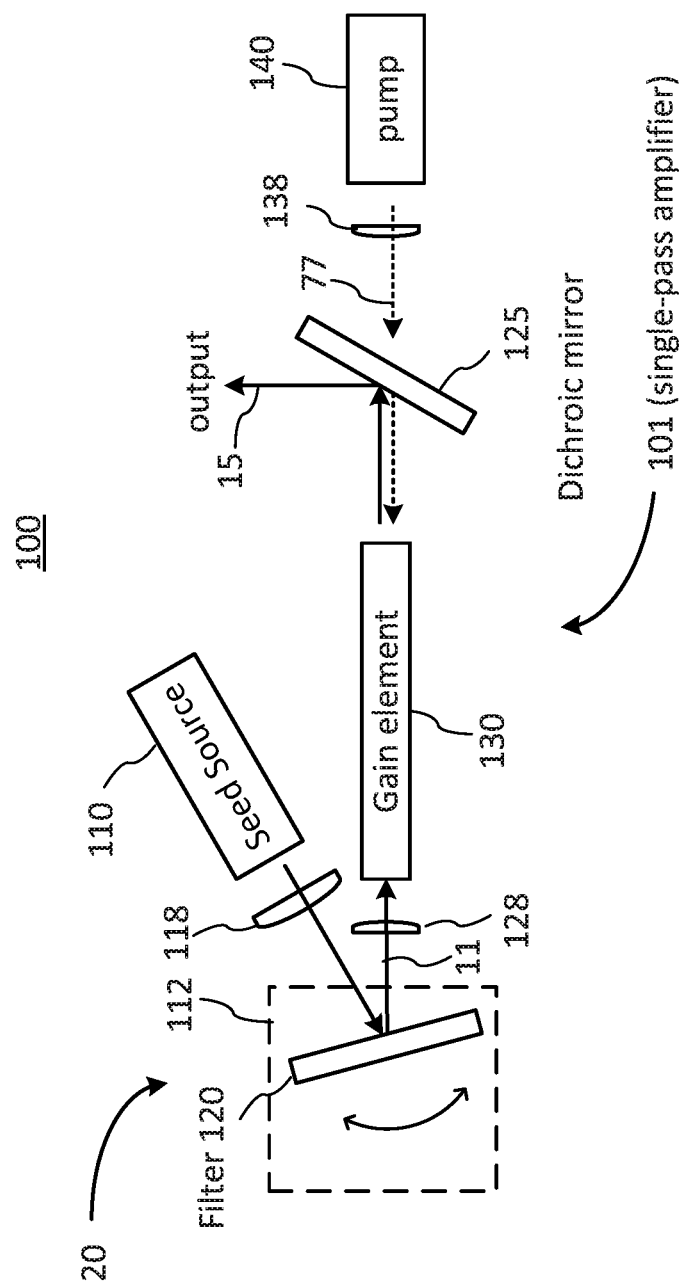
FIG. 3A is a schematic diagram of an embodiment of the optical pulse source of FIG. 1 with a reflective pulse shaping filter in front of a single-pass optical amplifier.

Referring now to FIG. 3A, there is illustrated one exemplary embodiment of the optical pulse source 10 in the form of a pulse source 100. It includes a single-pass optical amplifier 101 embodying amplifier 30 of FIG. 1, a seed pulse source 110 that may be substantially as described hereinabove with reference to seed optical source 5 of FIG. 2, and a reflective thin-film filter 120 embodying the pulse shaping filter 20. The single-pass optical amplifier 101 includes a gain element 130, which is coupled to an optical pump 140 in an end-pumping configuration using a coupling lens 138 and a dichroic mirror 125, with the latter functioning also as an output coupler for the amplified output pulses 15. It will be appreciated that other pumping arrangements may also be possible and are generally within the scope of the present disclosure. The gain element 130 may be for example in the form of a thin rod of a suitable gain material such as Yb:YAG and the like. Examples of suitable gain elements are described, for example, in "High-power ultrafast thin disk laser oscillators and their potential for sub-100-femtosecond pulse generation" by T. Südmeyer et al, Appl Phys B (2009) 97: pp. 281-295 and "Direct amplification of ultrashort pulses in μ-pulling-down Yb:YAG single crystal fibers" by Yoann Zaouter et al, OPTICS LETTERS, Mar. 1, 2011, Vol. 36, No. 5, pp. 748-750, both of which are incorporated herein by reference. The gain element 130 provides positive optical gain for the seed optical pulses 11 or the pre-shaped seed pulses 13 when suitably pumped; for example the gain element 130 made of Yb:YAG may provide the optical gain centered at the gain peak wavelength $\lambda_0$ of about 1030 nm with the gain spectral width 34 of 3-6 nm when optically pumped at a pump wavelength of about 940 nm. The optical pump 140 may be, for example, in the form of a high-brightness laser diode, which may be fiber-coupled as known in the art. A lens 128 may be used to couple a seed beam of the pre-shaped seed pulses 13 into the gain element 130. The dichroic mirror 125 is configured to transmit the pump light 77 therethrough into the gain element 130, and to reflect the amplified output pulses 15 in an output direction, as generally known in the art. Although a counter-propagating pumping arrangement is shown by way of example, it will be appreciate that a co-propagating pumping arrangement is also possible and would not change principles of operation of the amplifier 101 and the pulse source 100 that are relevant for the present disclosure.

Figure 3B:
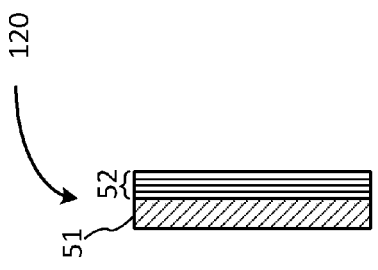
FIG. 3B a schematic diagram of a thin film notch filter.

Referring to FIG. 3B, the reflective thin film notch filter 120 may be embodied, for example, as a stack of thin film layers 52 disposed on a reflective substrate 51. The stack of thin film layers 52 may be configured to have, in reflection, the transmission filter characteristic 37 of the notch filter as generally described hereinabove with reference to FIG. 2(c) and filter 20. The desired depth and width of the notch 19 provided by the stack of thin film filters 52 may be selected for a particular gain element 130, and may depend on a target range of pump power and amplification level. By way of example, the notch 19 in the wavelength transmission characteristic 37 of the thin film notch filter 120 that is configured for use with a Yb:YAG gain element may be 2 to 6 nm wide, and 10% to 30% deep relative to a maximum transmission of the filter.

Referring back to FIG. 3A, the reflective thin film notch filter 120 is oriented to direct seed optical pulses 11 from the seed optical source 110 into the gain element 130, while broadening them as described hereinabove with reference to FIGS. 1 and 2, so as to pre-compensate for the gain narrowing effect in the gain element 130. Further as described hereinabove with reference to FIGS. 1 and 2, a desired optimum pre-shaping of the seed optical pulses 11 may require that the notch center wavelength $\lambda_f$ is accurately aligned with the center wavelength of the gain peak $\lambda_0$ of the gain element 110. In embodiments wherein the gain spectrum bandwidth 34 of the gain element 130 is narrow, for example in the range of 2-6 nm, as maybe the case when the gain element 130 is embodied as a single-crystal Yb:YAG material or the like, the desired value of the notch center wavelength $\lambda_f$ may be however difficult to achieve reliably and with a sufficient accuracy in the production of the thin film filter 120. Accordingly, in one embodiment filter 120 may be rotatable so as to enable the tuning of the notch center wavelength $\lambda_f$ to the desired wavelength, for example to enable its accurate alignment with the peak gain wavelength $\lambda_0$. In one exemplary embodiment, the thin film notch filter 120 may be positioned on a rotating stage 112 for rotating the filter and tuning its transmission characteristic in wavelength. It will be appreciated that a rotation of the filter 120 by an angle α about its axis of rotation may require rotating the seed source 110 about the same axis by 2α, so as to maintain the optical alignment between the seed source 110 and the gain element 130.

Figure 4:
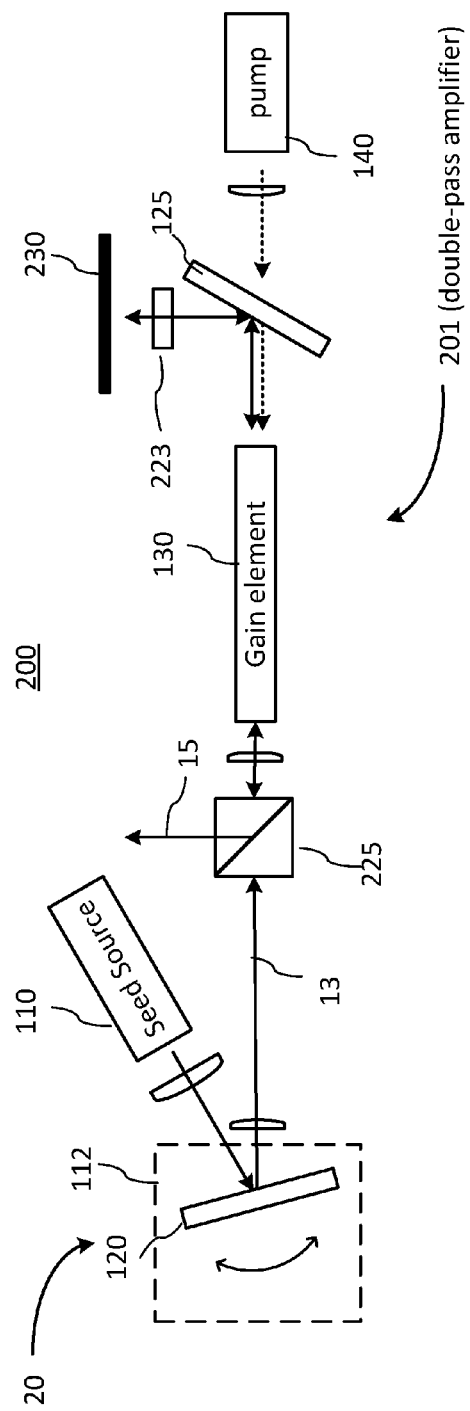
FIG. 4 is a schematic diagram of an optical pulse source with a reflective pulse shaping filter in front of a double-pass optical amplifier.

Turning now to FIG. 4, there is illustrated an optical pulse source 200 which may be viewed as an embodiment of the optical pulse source 100 of FIG. 3A wherein the single-pass amplifier 101 is converted into a double-pass amplifier 201 by the addition of a mirror 230 at a distal end of the gain element 130, and an output coupler 225 at a proximate (to the seed source) end of the gain element 130. The mirror 230 returns amplified seed pulses, after their first pass through the gain element wherein they propagated through the gain element in a forward direction, back into a distal (from the seed source) end of the gain element 130 for propagating in the gain element 130 in the reverse direction towards its proximate end. The output coupler 225 may be embodied for example using a polarization beam splitter (PBS), with a quarter wave plate (QWP) 223 added within the double-pass arrangement of the amplifier 201, for example in front of the mirror 230. The PBS 225 receives the amplified seed pulses 15 from the proximate end of the gain element 130 after their propagation through the gain element 130 in the reverse direction, with their polarization rotated by 90 degrees by a double pass through the QWP 223 with respect to the polarization of the pre-shaped seed pulses 13 at the input of the amplifier 201, and re-directs them in the output direction. Since the gain narrowing effect in the double-pass amplifier 201 may be stronger than in the single-pass amplifier 101 of the optical pulse source 100 of FIG. 3A for a same or similar single-pass gain in the gain element, the thin film notch filter 120 in the optical source 200 may be configured to have a somewhat deeper notch in its transmission characteristic than in the optical pulse source 100, so as to provide a stronger attenuation at the gain central wavelength $\lambda_0$.

Figure 5:
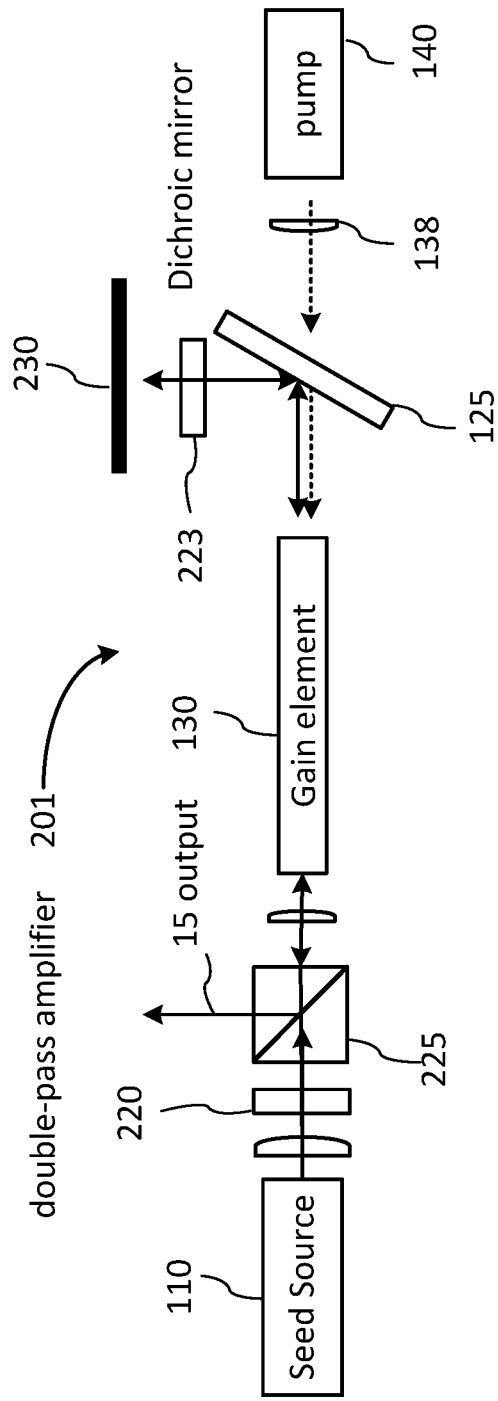
FIG. 5 is a schematic diagram of the optical pulse source of FIG. 4 with a transmissive pulse shaping filter in front of the double-pass optical amplifier.

Referring now to FIG. 5, the pulse shaping filter 20 may also be embodied in transmission using a transmissive thin film notch filter 220 having the transmission characteristic as generally described hereinabove with reference to FIGS. 1-4. Filter 220 may be for example a thin film interferometric filter that may be fabricated by depositing a suitably configured stack of thin film layers on a transparent, for example glass, substrate. Although FIG. 5 illustrates a variation of the optical pulse source 200 with the double-pass optical amplifier, it will be appreciated that the transmissive filter 220 may also be used in embodiments with the gain element in a single-pass configuration, such as that illustrated in FIG. 3A.

Figure 6:
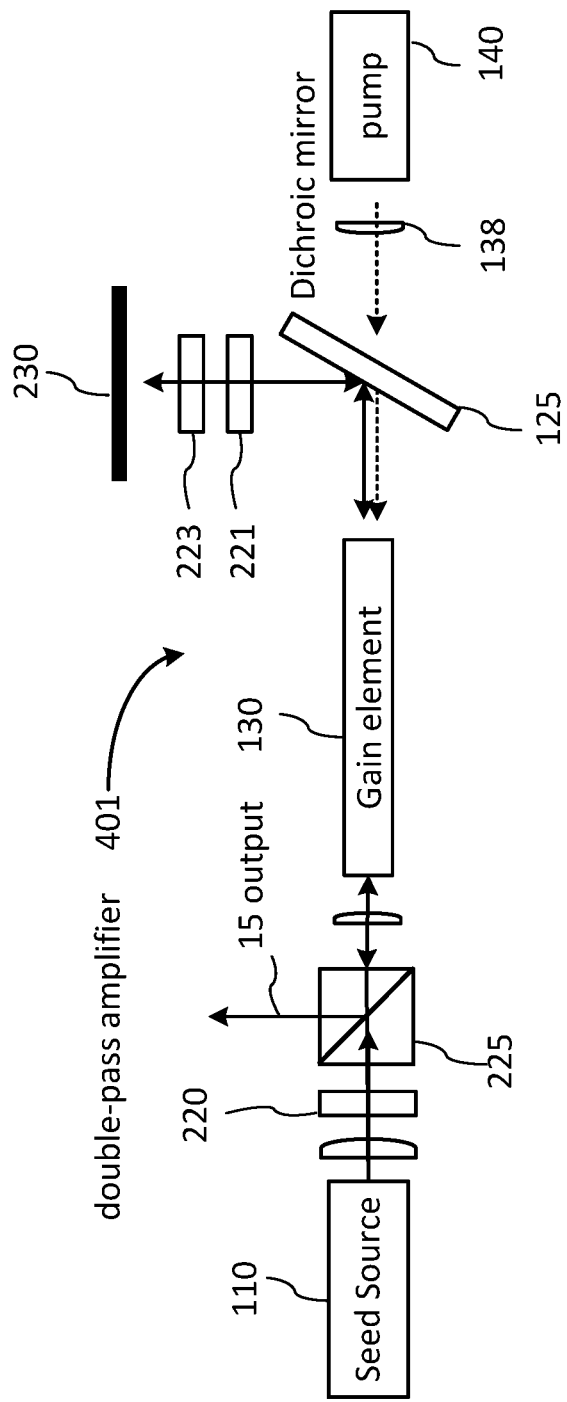
FIG. 6 is a schematic diagram of an optical pulse source with a second pulse shaping filter inside the double-pass optical amplifier.

In the double-pass embodiments described hereinabove with reference to FIGS. 4 and 5, the pulse shaping filters 20, 120 and 220 are disposed operationally in front of the double-pass configuration formed by the mirror 230 and the output coupler 225, so that the pulse-shaping filter receives only non-amplified seed pulses 11. The positioning of the pulse shaping filter operationally in front of the optical amplifier and outside of the double-pass arrangement 225-230 reduces the likelihood of damaging the thin film coatings of the pulse shaping filter by optical pulses, which may be particularly advantageous in embodiments with a high single-pass gain and high output optical power from the amplifier. However, embodiments including a pulse shaping filter within a multi-pass optical amplifier may also be envisioned within the scope of the present disclosure. One such embodiment is illustrated in FIG. 6, which differs from the embodiment of FIG. 5 by the addition of a second pulse shaping filter 221 inside the double-pass optical configuration of the double-pass amplifier 401 defined by the mirror 230 and the output coupler 225. In the illustrated exemplary embodiment, the second pulse-shaping filter 221 is a transmissive filter that is disposed between the gain element 130 and the mirror 230, and is passed twice by the pulses being amplified. One potential advantage of this configuration is that it may allow using interferometry filters having shallower notches in their transmission characteristic as compared to filter 220 of FIG. 5, which may be easier to manufacture. It will be appreciated that the second transmissive filter 221 may also be added within the double-pass optical amplifier 201 of the embodiment of FIG. 4 having a reflective thin film filter 120 in front of the amplifier.

Figure 9:
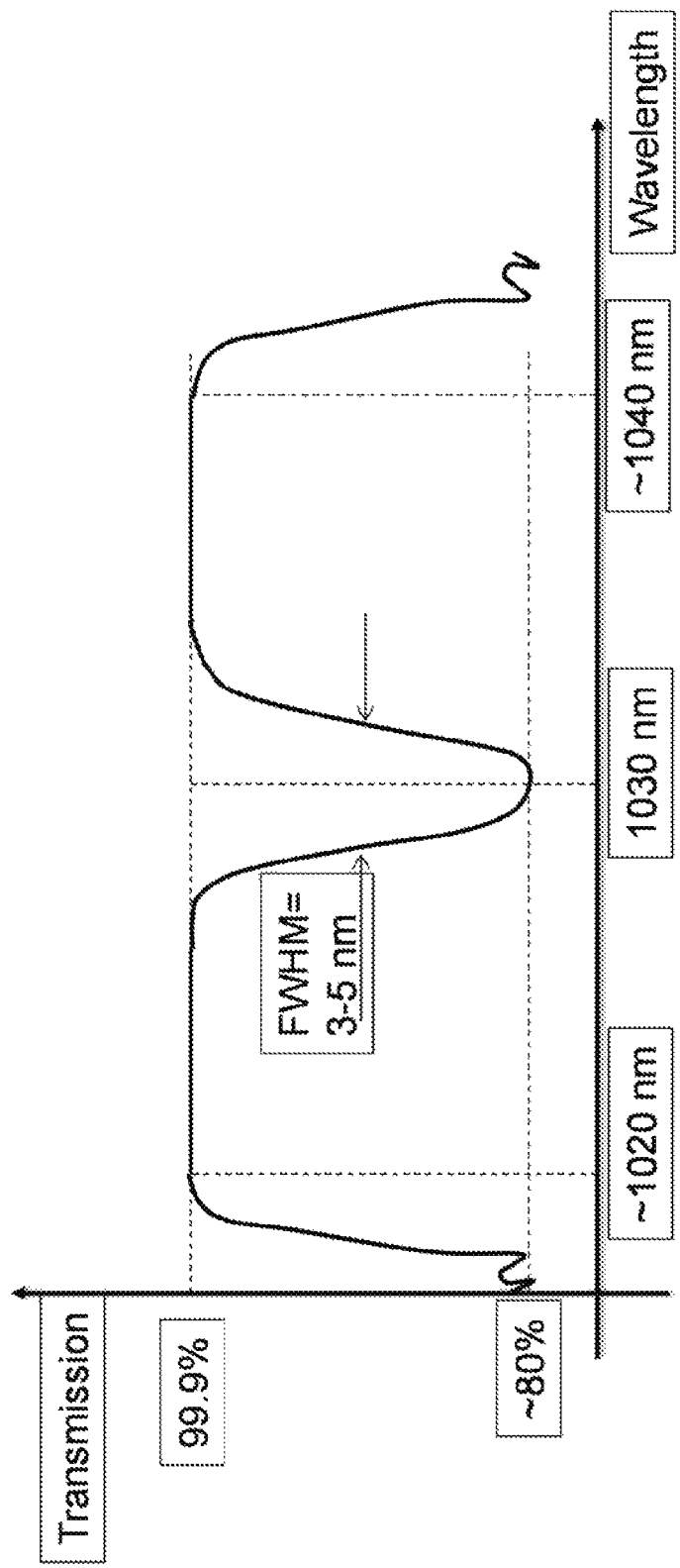
FIG. 9 is a graph illustrating an exemplary transmission characteristic of a thin-film notch filter embodying the pulse-shaping filter.

In various embodiment, the pulse shaping filter 20, 120 or 220 may be configured so that is transmits at least 95% of incident light at a wavelength few nanometers away from the central wavelength $\lambda_0$ of the bell-like gain spectrum 33 of the gain element 130, and to transmit less than 85% of the incident light at the gain peak wavelength $\lambda_0$, or the central wavelength $\lambda_f$ of the notch 19 in the transmission or reflection characteristic of the filter. The shape, width and depth of the notch 19 in the transmission or reflection characteristic of the pulse shaping filter 20 should preferably be optimized for a particular gain element and amplifier arrangement, and may differ for different embodiments. FIG. 9 illustrates an exemplary transmission characteristic of the pulse shaping filter 20 for an embodiment of FIG. 3 with a single-pass amplifier using a Yb:YAG gain element with a single pass gain in the range of 7-13 dB. The exemplary filter, which may be embodied as a reflective or transmissive thin film filter as described hereinabove, has a notch in its transmission characteristic that is centered at the Yb:YAG gain peak wavelength of ~1030 nm, and has an approximately inverse Gaussian shape with a FWHM width in the range of 3 to 5 nm that may match, or be slightly less, than the gain spectral width of the Yb:YAG gain element, with the depth of the notch of about 20% of its maximum transmission. In other embodiments target values of the width an depth of the notch in the filter transmission characteristic may be different, for example depending on the spectral shape and magnitude of the single-pass or double-pass gain spectrum of the gain element, and on the overall amplifier design. For example, some embodiments may benefit from filters with the depth of the notch in the filter transmission in the range of 10% to 30%, and up to 50%, and with the notch spectral width as small as 2 nm.

Figure 7:
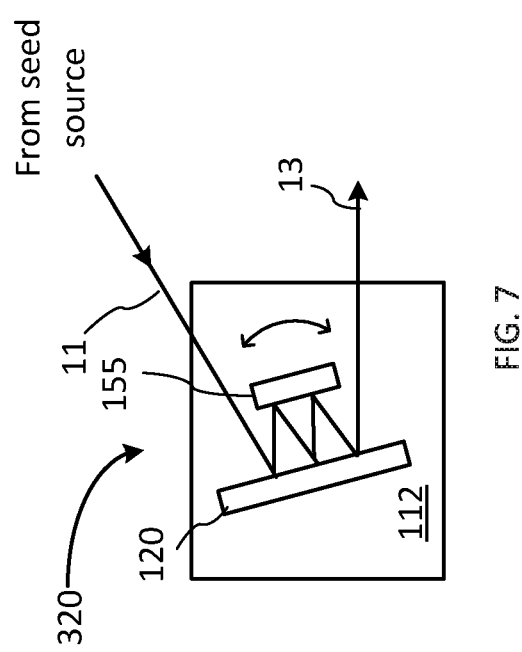
FIG. 7 is a schematic diagram of a multi-pass embodiment of the pulse shaping filter.
Figure 8:
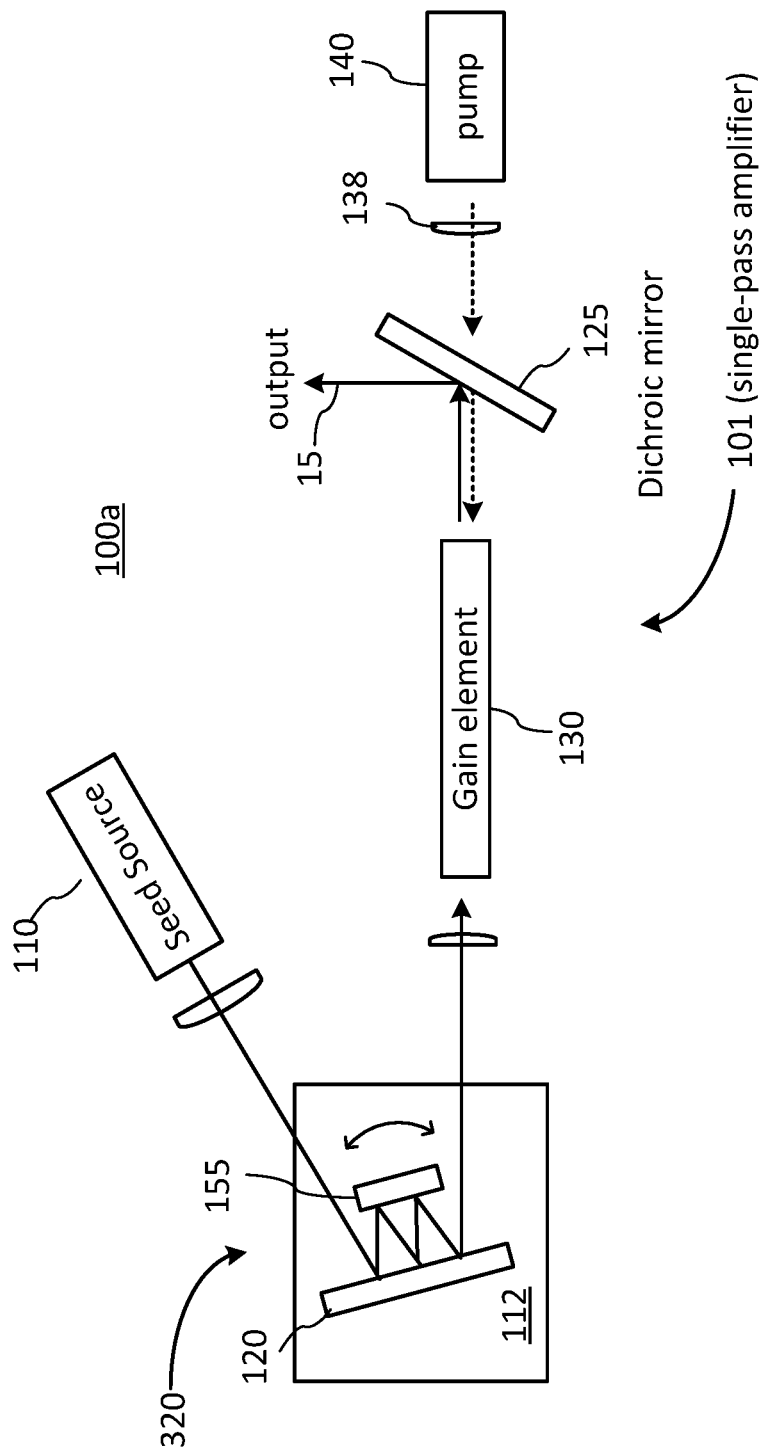
FIG. 8 is a schematic diagram of an embodiment of the optical pulse source of FIG. 3 with a multi-pass pulse shaping filter in front of the single-pass optical amplifier.

Referring now to FIG. 7, the pulse shaping filter 20 may be embodied as a multi-pass filter 320, which includes a mirror 155 that is optically coupled to the reflective thin film notch filter 120 in a multi-pass configuration. In the multi-pass filter 320, the seed optical pulse 11 is filtered by the thin film notch filter 120 two or more times prior to being directed to an optical amplifier. This multi-pass filter configuration may be useful, for example, when a thin film filter with the desired combination of the width and depth of notch 19 in the filter transmission characteristic is difficult to manufacture reliably. By reflecting the seed pulses from the same thin film notch filter 120 several times without passing the pulses through the gain element in-between consecutive reflections from the thin film filter, the design of the thin film filter 120 may be to some extent de-coupled from the amplifier design. It may also enable the use of the thin film filter 120 with the notch in its transmission characteristic that is shallower and broader than that is desired for an optimum pulse pre-shaping in a given amplifier, and which therefore may be easier to manufacture. Advantageously, the multi-pass pulse shaping filter 320 may be configured so that, prior to entering the single-pass or multi-pass optical amplifier 30, the seed optical pulses 11 are reflected by, or transmitted through, the thin film notch filter 120 a number of times that is greater than the number of passes thereof through the gain element 130 of the amplifier. It will be appreciated that the multi-pass filter 320 of FIG. 7 may be used as the pulse shaping filter in front of the amplifier in any of the embodiments described hereinabove. An example of it use as the pulse shaping filter 20 in front of the single-pass amplifier 101 in the optical pulse source 100 of FIG. 3A is illustrated in FIG. 8. It will also be appreciated that the multi-pass filter 320 may be embodied using a transmissive thin film notch filter disposed between two mirrors.

In the exemplary embodiments described hereinabove, the use of a passive pulse-shaping thin film filter in front of a single-pass or double-pass amplifier with a gain bandwidth of 3-20 nm to pre-compensate for the gain narrowing effect in the amplifier enables obtaining up to two times shorter output optical pulses compared to the same amplifier without a preceding pulse shaping filter. By way of example, conventional optical amplifiers based on Yb:YAG gain elements may provide output optical pulses in the range of 700-1200 fs, which may be shortened to 300-600 fs or less by the addition of the passive pulse pre-shaping filter in front of the optical amplifier as described hereinabove.

The above-described exemplary embodiments are intended to be illustrative in all respects, rather than restrictive, of the present invention. Thus the present invention is capable of many variations in detailed implementation that can be derived from the description contained herein by a person skilled in the art. For example, although particular embodiments described herein may have been described with reference to gain elements based on Yb:YAG single crystal rods, crystals, disks, or fibers, gain elements based on other Yb doped amplifier materials, such as but not exclusively Yb:YAG, Yb:KYW, Yb:KGW, and Yb:CALGO material, may also be used within the scope of the present disclosure, as well as other narrow-bandwidth high-gain optical materials such as those capable of providing optical gain with the 2-10 nm bandwidth and 5 dB or more single pass gain that may be useful in single-pass and double-pass amplifier designs. In another example, the pumping and single-pass and double-pass pulse input/output arrangements that are illustrated in the figures and described hereinabove are by way of example only, and other suitable configurations of the respective optical amplifiers can also be envisioned based on the present disclosure. All such and other variations and modifications are considered to be within the scope and spirit of the present disclosure as defined by the following claims. Furthermore, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, the present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

I claim:

1. An optical pulse source comprising:
    a seed optical source configured to generate a seed optical pulse of a sub-picosecond duration;
    a pulse shaping filter configured to receive the seed optical pulse and broaden, prior to amplification of the seed optical pulse, the seed optical pulse in spectrum to pre-compensate for a gain narrowing effect associated with the amplification; and
    an optical amplifier, including a gain element providing a gain spectrum, configured to amplify the broadened seed optical pulse,
        where a number of passes through, or reflections from, the pulse shaping filter by the seed optical pulse exceeds a number of passes through the optical amplifier by the broadened seed optical pulse.

2. The optical pulse source of claim 1, where the pulse shaping filter is a notch filter.

3. The optical pulse source of claim 2, where the notch filter has a notch center wavelength aligned with a wavelength gain peak of the optical amplifier.

4. The optical pulse source of claim 1, where the pulse shaping filter has a notch that has a width of 2-6 nm.

5. The optical pulse source of claim 1, where the gain element comprises Yb doped material.

6. The optical pulse source of claim 1, where
    the gain element provides a gain magnitude of at least 3 dB and a gain bandwidth of less than 20 nanometers, and
    the gain spectrum is a bell-like gain spectrum.

7. The optical pulse source of claim 1, where the pulse shaping filter has a notch that has a depth of 10-30% of a maximum transmission of the pulse shaping filter.

8. The optical pulse source of claim 1, where the pulse shaping filter includes a stack of thin film layers disposed on a reflective surface.

9. The optical pulse source of claim 1, where the pulse shaping filter includes a stack of thin film layers disposed on a transparent surface.

10. A method comprising:
    generating, by a seed optical source, a seed optical pulse of a sub-picosecond duration;
    receiving, by a pulse shaping filter that includes a stack of thin film layers disposed on a reflective surface, the seed optical pulse;
    broadening, by the pulse shaping filter and prior to amplification of the seed optical pulse, the seed optical pulse in spectrum to pre-compensate for a gain narrowing effect associated with the amplification; and
    amplifying, by an optical amplifier including a gain element providing a gain spectrum, the broadened seed optical pulse.

11. The method of claim 10, further comprising:
    reducing, using a notch associated with the pulse shaping filter, a gain narrowing effect of the optical amplifier.

12. The method of claim 10, where the gain element comprises Yb doped material.

13. The method of claim 10, the gain element provides a gain magnitude of at least 3 dB and a gain bandwidth of less than 20 nanometers, and
    the gain spectrum is a bell-like gain spectrum.

14. The method of claim 10, where a quantity of times that the seed optical pulse is transmitted through, or reflected by, the pulse shaping filter exceeds a quantity of times that the seed optical pulse is transmitted through the gain element.

15. A device comprising:
    a notch filter configured to:
        receive a seed optical pulse of a sub-picosecond duration from a seed optical source; and
        broaden, prior to amplification of the seed optical pulse by an optical amplifier, the seed optical pulse in spectrum to pre-compensate for a gain narrowing effect associated with the amplification.

16. The device of claim 15, where the notch filter includes a minimum value, associated with a transmission characteristic, at a particular wavelength.

17. The device of claim 16, where the particular wavelength is substantially equal to a central wavelength of a gain spectrum of the optical amplifier.

18. The device of claim 15, where the notch filter includes a stack of thin film layers disposed on a reflective surface.

19. The device of claim 18, where a depth and a width of the stack of thin film layers is selected based on information associated with a target range of pump power and amplification.

20. The device of claim 15, where the notch filter is rotatable for aligning a particular wavelength thereof with a central wavelength of a gain spectrum of the optical amplifier.

21. The device of claim 15, where a spectral width of the notch filter is approximately 20 nm.

22. The device of claim 15, where the notch filter has at least one of:
    a notch center wavelength aligned with a wavelength gain peak of the optical amplifier, or
    a notch that has a width of 2-6 nm.

23. The device of claim 15, where a number of passes through, or reflections from, the notch filter by the seed optical pulse exceeds a number of passes through the optical amplifier by the broadened seed optical pulse.

* * * * *